INVENTOR
RICHARD KELLY
BY Robert Harding Jr.
ATTORNEY

INVENTOR
RICHARD KELLY
BY Robert Harding Jr
ATTORNEY

Oct. 27, 1953 R. KELLY 2,657,279
ELECTRICAL POWER SUPPLY SYSTEMS FOR
COMMUNICATION SYSTEM REPEATERS
Filed April 29, 1950 4 Sheets-Sheet 3

INVENTOR
RICHARD KELLY
BY Robert Harding Jr.
ATTORNEY

Station Alarm (or Buzzer) Circuits

INVENTOR
RICHARD KELLY
BY Robert Harding Jr.
ATTORNEY

UNITED STATES PATENT OFFICE 2,657,279

ELECTRICAL POWER SUPPLY SYSTEMS FOR COMMUNICATION SYSTEM REPEATERS

Richard Kelly, London, England, assignor to International Standard Electric Corporation, New York, N. Y., a corporation of Delaware Application April 29, 1950, Serial No. 158,982
In Great Britain May 3, 1949

7 Claims. (Cl. 179—170)

This invention relates to telecommunication systems with particular reference to power supply arrangements therefor.

According to the invention, there is provided a telecommunication system comprising a transmission line, a number of stations e. g. repeater stations along said line and power supply stations at each end of said line for supplying the said stations with energising power over the said line, wherein the power supply at one end is unregulated and arranged to supply a fraction of the total power required for the whole system sufficient to test the line and stations for faults and in the absence of faults to prepare the said stations for receiving normal power, and wherein the power supply at the other end is regulated and is arranged to be applied to the line after said test has been successfully completed and to supply current thereto in gradually increasing quantity until a controlled current flow for the system as a whole is attained.

Also according to the invention, there is provided a telecommunication system comprising a transmission line and a number of stations, e. g. repeater stations, along said line, direct current power supply equipments located at opposite ends of the said line for supplying the said stations with energising power over the said line the said equipments comprising regulated and unregulated supply means in respect of the current supplied by them, wherein the unregulated supply means is intended to supply a fraction of the total power required for the whole system, sufficient to test the line and stations for faults and in the absence thereof to prepare the said stations for receiving normal power, and wherein the regulated supply means is intended to supply the remaining power requirements; timing means associated with the regulated supply means and responsive to the flow of said test current to cause the said regulated supply means to be energised from a main source of supply after a predetermined interval of time; means in said regulated supply means responsive to the application of main supply power to cause power to be supplied to the said line; and means in said regulated supply means for controlling the output of power therefrom whereby the combined line current flowing may increase gradually from an initially subnormal value to a final controlled value for the system as a whole.

A "transmission line" in this invention is intended to include a complete line terminated at its ends in terminal stations, or a section of a complete line included between two repeater stations at which it is convenient to locate power supply equipment, and will in general comprise a coaxial type of cable, though other types of cable, if suitable for the transmission of power at the voltages and amperages necessary, are obviously not excluded.

In modern telecommunication systems employing a number of closely spaced, unattended, repeater stations, it is customary to supply operating power for these repeater stations from centrally located power plant at terminal and/or main repeater stations, over the conductors used for the communication system itself. This system has been used successfully in several coaxial cable carrier communication systems, and is probably the only possible system of supply for submarine repeaters.

For such systems, submarine systems in particular, the utmost precautions must be taken to prevent current or voltage shocks to the valves or other sensitive equipment in the repeaters, either at the moment of switching on, when valve heater resistances are low, or in certain other contingencies giving rise to heavy short circuit currents or high over-voltages.

We have already made proposals to meet these contingencies by providing protective equipment at each individual repeater.

It is now proposed to provide a power supply system for a group of repeaters in which the necessary protective controls are located in one of the terminal, or main, supply stations, and in which the power is applied in two successive stages, the successful application of power in the first stage, at low level, causing the remainder of the power to be applied in controlled amount up to a controlled current level.

The invention will now be described with reference to the accompanying drawing illustrating a preferred embodiment.

In the drawing:

Fig. 2 shows schematically and in detached contact form the elements of the power supply arrangements at one end (the controlled end) for automatically connecting the power to the line, and includes the protective controls referred to;

Figure 2:
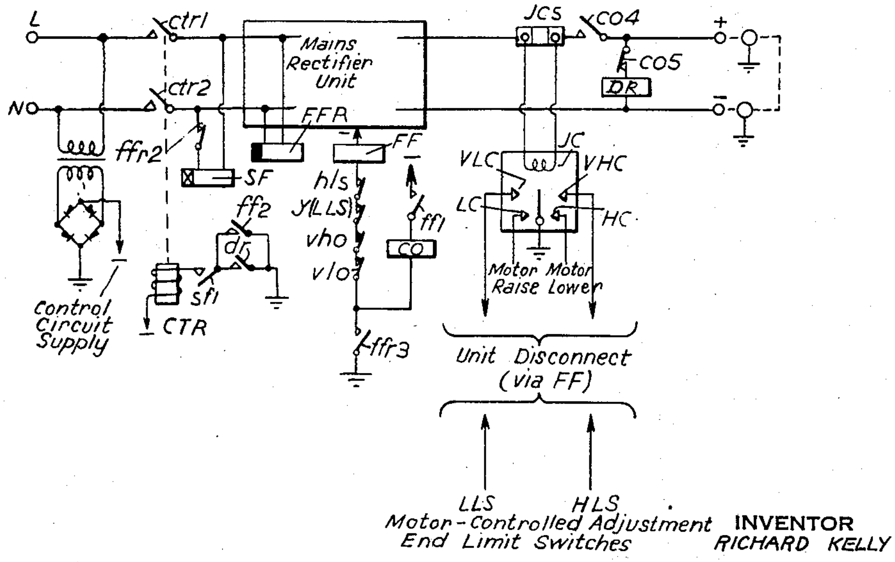
Figure 3:
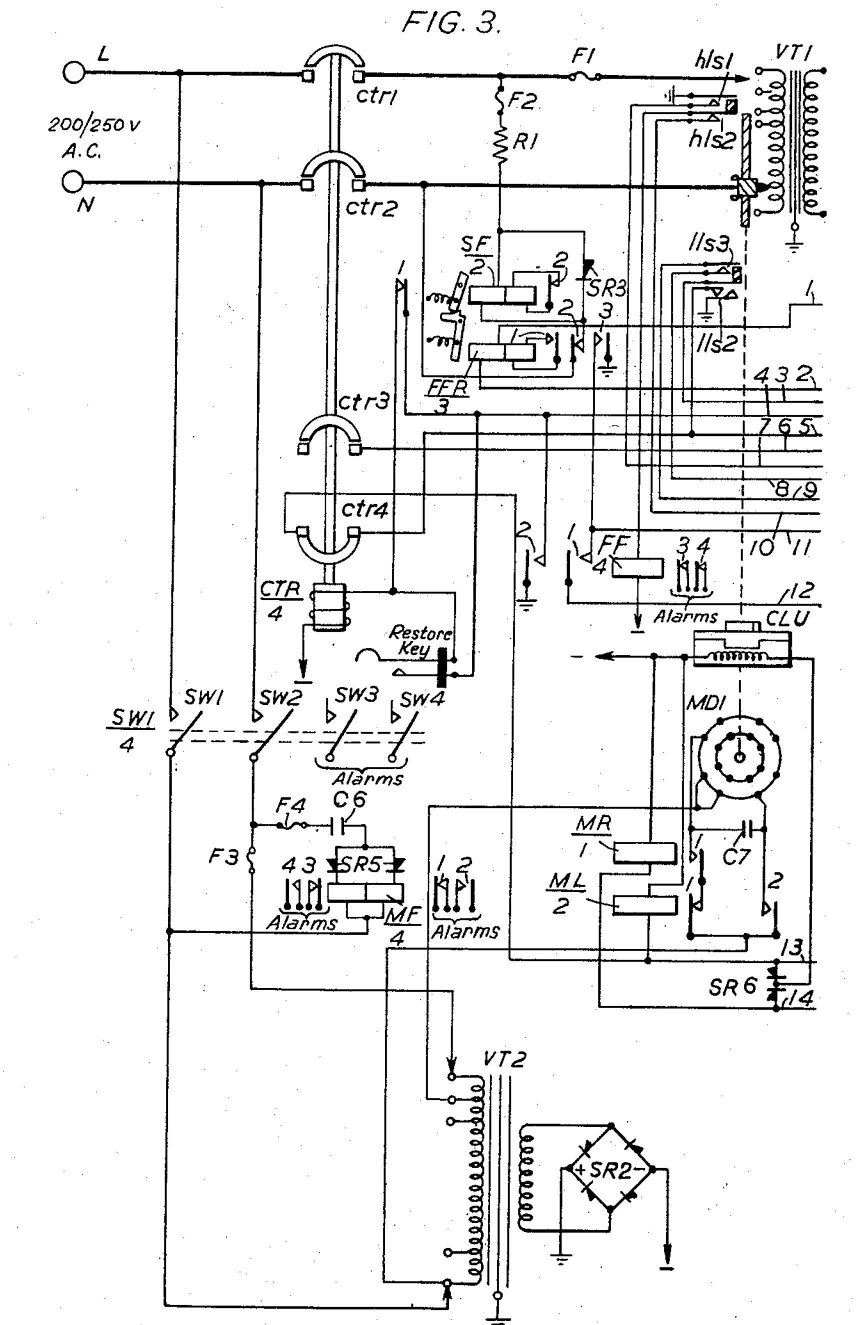
Figure 4:
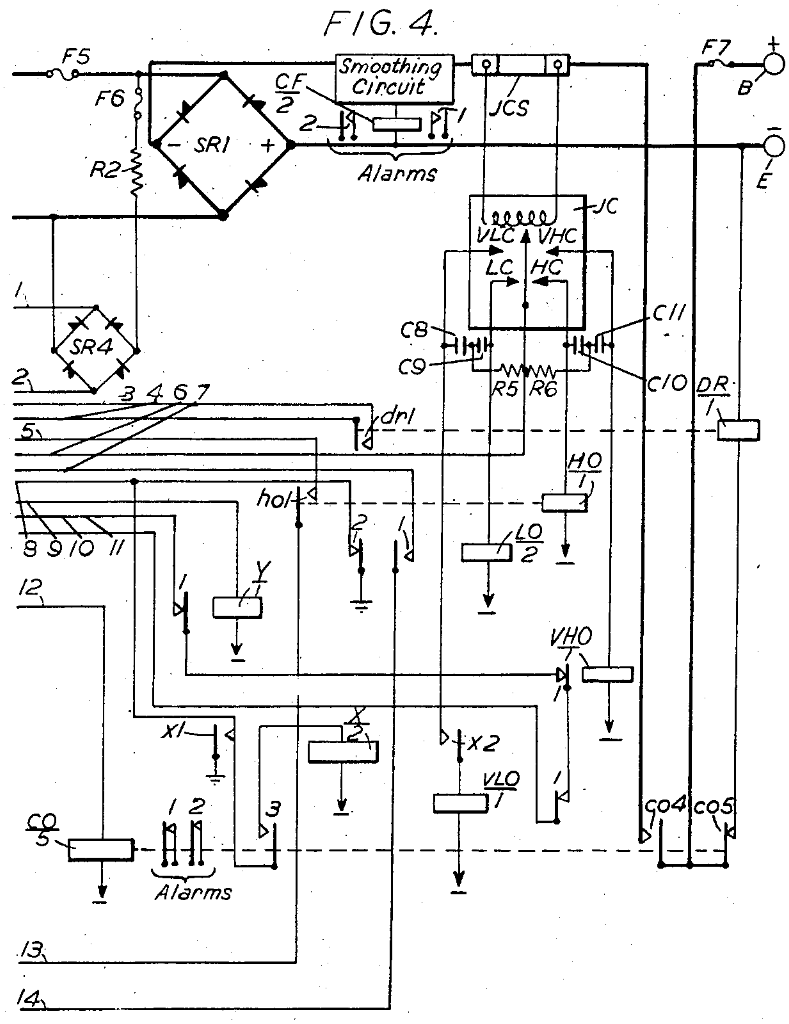
Figure 5A:
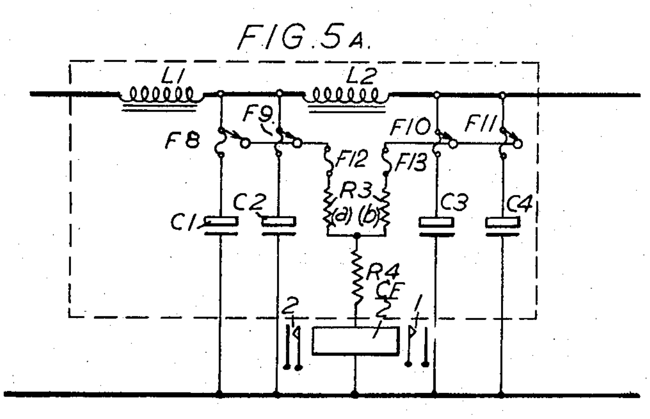
Figure 5B:
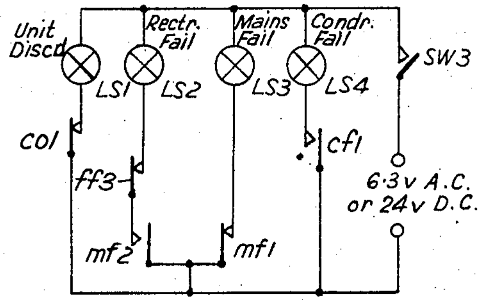
Figure 5C:
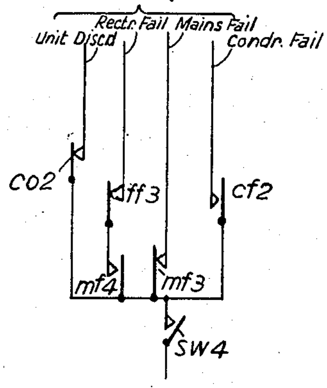

Figs. 3 and 4 placed together, side-by-side, in that order show circuit details of the equipment of Fig. 2, while Fig. 5, comprising Figs. 5A—5C, shows certain minor circuit details not conveniently included in Figs. 3 and 4.

Figure 1:
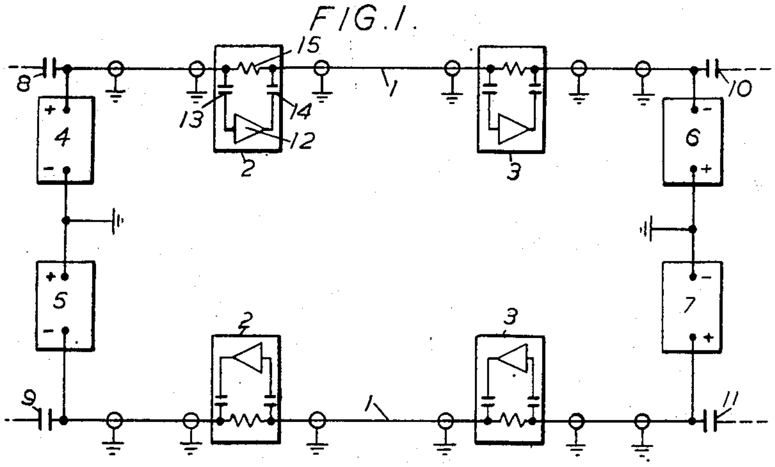
Fig. 1 illustrates diagrammatically a section of a 4-wire coaxial cable system with two intermediate repeaters supplied with power from both ends of the section on a "ring-main" basis.

Referring now to Fig. 1, this shows a section of a two-way coaxial cable communication system 1 comprising two adjacent repeater stations 2, 3, fed with direct current from both ends of the section by means of supply units 4—7 located at other stations (not shown) on the system and feeding directly over the cores of the coaxial cables (also referred to as "tubes"). These other stations may be terminal stations, main repeater stations or ordinary repeater stations with power supply, and they are shown isolated from adjacent sections of the coaxial cable for direct current purposes by blocking capacitors 8—11. For ease of reference, these other stations will be refered to as "W" and "E" (for 4, 5 and 6, 7, respectively).

Each repeater station 2, 3, comprises two single way repeaters (amplifiers), e. g. 12, coupled to the cable for communication purposes by coupling and blocking capacitors, e. g., 13, 14, while the load on the direct current supply is represented as a series resistor, e. g. 15. In practice, a rather more complicated separating filter and power supply network would generally be provided than this simple arrangement shown, but such details are not relevant to the invention.

The supply units 4—7 preferably comprise mains units supplied with alternating current, conversion to direct current at a suitably high voltage being effected by means of dry rectifiers. The mains units 4 and 5 are regulated in any well-known manner to feed a constant current to the line in spite of mains voltage and load variations, while the units 6 and 7 are unregulated themselves in any way. These latter units will preferably be operated from a regulated supply of alternating voltage controlled to ±1%, but no automatic correction is made to their output voltage or the load current demanded to offset variations in such load. The regulated mains units are preferably dynamically controlled with a marginal relay or relays to effect the necessary current controls.

The mains units at the two ends of the section are connected in series-aiding round the complete loop, thus making a "ring-main" supply arrangement; the mid-connection points of the units at each end are grounded.

The load voltages of the mains units are so selected that the station E units supply power to overcome the drop in voltage in the transmission equipment at station E termination, the drop in the tube between station E and the first repeater from there (3) and in that first repeater, thereby leaving the drop in voltage between this first repeater and the second repeater, the drop in the second repeater, the drop between the second repeater and station W and the drop in the transmission equipment at terminal station W to be overcome by the controlled mains units at station W.

The mains units are arranged in such a way that the unregulated mains units at station E must first be switched on and complete the loop through the repeaters and through by-pass circuits at station W comprising the back contacts of a relay and the windings of a delay relay at station W, thereby sending a reduced current through the circuits and giving an initial warming up to the valves. After a predetermined time fixed by the operation of the delay relay, the by-pass circuit at station W is removed and the current controlled mains units are added into the circuit instead, in series-aiding with the unregulated mains units at station E. These current controlled mains units are automatically connected to the line under their minimum output condition and build up to the correct current output so that at no time upon switching on or during operation will the valves receive more current than normal.

It is essential that the mains units be connected to line in the order specified above since the switching on of the current controlled units first would cause them to endeavour to supply the full power to the line so that upon connection of the unregulated mains units to the line, the current controlled units would have to reduce their outputs to normal, but in the meantime causing a shock to the valves and equipment throughout the system.

If upon switching on of the unregulated mains unit at station E the line is either open circuited, or earthed between the two stations, the current will not be applied to the delay relay at station W and although the control circuit of the unit at that station may be switched on it is impossible for the mains unit to be automatically connected either to the A. C. supply or the load. Moreover, the current drawn from the unregulated mains unit will still be less than the normal current for the repeaters.

Open circuit of the cable anywhere between the two stations W and E will cause a marginal current relay at station W having two "low" current positions and two "high" current positions to operate immediately its very low output relay (VLO) which shuts down the current control unit and gives an alarm. This unit cannot again be connected to the line until the delay relay DR is operated from the other terminal which cannot happen until the open circuit has been cleared.

Earthing of the coaxial tubes between station W and the station W side of the first repeater from W will create a surge through the marginal current relay causing it to operate its very high output (VHO) relay and may even blow the output fuse of the mains unit at station W. If VHO operates before the fuse can blow then it shuts down the unit by VHO releasing the contactor. If the fuse blows first then the marginal current relay will operate VLO and hence shut down the unit. Thus, if the fuse does not blow then the unit is shut down by VHO, but if the fuse blows, the unit is shut down by VLO. In either case the unit is disconnected from the load, and the by-pass to the mains unit is introduced into the circuit with the delay relay in it.

In addition to protection for open circuits and earthing, the units at station W are designed to shut down under working conditions if a gradual fault occurs in the circuit causing the control gear to operate to one extreme or the other over a long period. When either limit is reached, the unit is shut down.

A failure of the mains unit at station E will cause the VLO circuit to operate in the corresponding unit at station R and shut it down, as this will correspond to an open circuit or high resistance in the loop.

The features just outlined are illustrated with the minimum amount of detail in Fig. 2, which shows the elements of a preferred type of mains supply units at a terminal or station such as W.

In Fig. 2, the output terminals marked + and — are intended to be connected to one of the coaxial tubes, core and sheath respectively, and when the current is applied at the distant end (E) from the unregulated supplies, it flows to W and the circuit is completed there via the by-pass circuit comprising delay relay DR and back contact *co5* of relay CO. Relay DR eventually operates (e. g. in 1 minute) and at its contact closes a circuit for a contactor CTR via a back contact *sf1* of relay SF, and CTR therefore operates, causing alternating current to be applied to the mains-rectifier unit via *ctr1* and 2.

Simultaneously, relays SF and FFR are energised by the A. C., but SF, being made much slower to operate than FFR, is prevented from operating at *ffr2*, and so does not interrupt the contactor circuit at this stage. Relays SF and FFR comprise a mechanically locking pair, SF being the locking element and FFR the release element; each is provided with contact spring sets, and SF is designed to operate under certain fuse failure conditions to cut off the supply (by releasing CTR).

At this stage, contacts *vlo* and *y* in the operate circuit of relay FF are open, but the regulating gear inside the mains-rectifier unit has been set in motion, and in due course, *y* and *vlo* fall back, FF operates, causing CO to be operated (via *ff1*) and connecting the mains unit output through to the line (at *co4*). DR is released at *co5*, but CTR continues to be held (over *ff2*).

The current from the mains unit now builds up, being detected in series marginal relay JC, and finally the pointer of this relay floats free of its side contacts, cutting off the motor controlling gear of the regulating equipment.

A cable open-circuit (or very low current condition) will throw JC back on to its extreme left hand contact (VLC) where it will operate relay VLO to open the circuit of FF at *vlo*, and hence disconnect the mains unit from the line (via release of CO).

A cable short-circuit, if it does not blow a fuse, will throw JC on to its high contact, VHC, operating relay VHO, and again releasing FF (at *vho*).

The complete operating technique for a controlled mains unit will now be described with reference to Figs. 3, 4 and 5.

In the Figs. 3 and 4, placed side by side, it is assumed that a source of alternating current has been connected to line and neutral terminals, L and N, that terminals B and E are connected to the core of one of the cables and to its sheath respectively, a "straight" (uncontrolled) mains unit being connected at the other end.

Figure 1A:
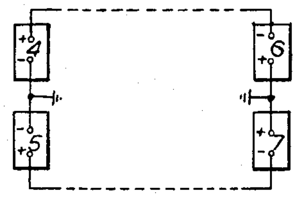
Fig. 1A shows an alternative arrangement.

It may be noted, by way of digression, that a second cable and second mains units are not essential to form a ring main, as with a single cable and the one pair of mains units (at either end) a return circuit is formed via ground (cable sheath). This form of arrangement is illustrated in Fig. 1A, where the main units at each end are connected in opposition, this making ground return a pre-requisite for operation, and constituting the power supplies for the two cables as two separate entities.

Such an arrangement, employing one cable only and one supply unit at each end, the two units connected in series-aiding round the loop consisting of the cable core and sheath, would be suitable for a transmission system using a single cable for both "go" and "return" circuits with different modulating frequencies for the two directions of transmission.

*Normal operating procedure*

Reverting to Figs. 3 and 4, the unit is prepared for service at the input end by operation of SW1, a manual 4-pole switch, while at the output (D. C. end) relay DR, which bridges the coaxial cable input terminals via *co5*, is energised by the warming up current applied from the far end of the cable and will, in due course, provided there are no abnormal conditions present, operate.

Contacts *sw1* and *sw2* of switch SW1 connect the mains supply to the control circuit transformer, VT2, via fuse F3, and via fuse F4 to the mains failure relay, MF. Capacitor C5 acts as a series impedance, and full-wave rectifier SA5 enables the relay to hold steadily on A. C.

Contact *sw3* connects a low voltage local supply of 6.3 v. A. C. or 24 v. D. C. to the alarm lamp circuit, (Fig. 5B), and contact *sw4* connects the unit alarm circuit to the station alarm (or a local buzzer) circuit (Fig. 5C), Contact *co1* completes the "unit disconnected" alarm lamp circuit, LS1 (Fig. 5B), and

*co2* completes the "unit disconnected" station alarm (or local buzzer) circuit.

MF being now energised,

*mf2* completes the "rectifier failure" alarm lamp circuit, LS2,

*mf1* opens the "mains failure" alarm lamp circuit, LS3,

*mf4* completes the "rectifier failure" station alarm (or local buzzer) circuit, while

*mf3* opens the "mains failure" station alarm (or local buzzer) circuit.

With the mains supply now connected to transformer VT2, a supply of direct current, rectified in SR2, is obtained for unit controlling purposes and relay $$\frac{ML}{2}$$

and the motor clutch (CLU) thereupon operate from SR2(—) to ground via *ctr4* and *lls2*, and via SR6, *ctr4* and *lls2* respectively.

Contact *ml2* completes the circuit for the "lower" winding of the motor MD1 and the motor, by means of the clutch, now drives the brushgear of VT1 down to its minimum output position.

Contact *ml1* provides a protective break in the "motor raise" circuit. (This will be considered later.)

The brushgear at its minimum output position mechanically operates the low limit switch LLS.

Contact *lls1* prepares the circuit for the operation of contactor CTR, when DR finally operates;

Contact *lls2* opens the clutch and the ML relay circuit, thus preventing any further rotation of the brushgear and disconnecting the supply from the motor.

Contact *lls1* should make before contact *lls2* breaks; these are provided as a make-before-break set.

Contact *lls3* completes the circuit for the operation of relay $$\frac{Y}{1}$$

over *lo2*, thereby transferring the function of *lls3* to relay Y, and placing it under the control of LO.

Contact *lls3* must operate before contact *lls1* to prevent a state of hunting being set up subsequently. Operation of Y at this stage, and the consequent opening of the operate circuit of relay FF at *y1*, is of no vital significance since contact *ffr3* is not yet closed. However, the operation of *lls1* combined with the closure of *dr1* energises CTR via *sf1* normal. Operation of CTR extends, at *ctr1* and 2, alternating current to VT1 (via fuse F1) and to relay pair SF—FFR (a mechanical locking pair), and via F5 to the main rectifier SR1. At *ctr3*, ground is connected to the armature of the marginal current relay, JC; and at *ctr4*, CTR opens the motor lower relay (ML) and clutch operating circuit, putting it under the control of relay HO. R1 and R2 are current limiting resistors for SF and FFR respectively, F2 and F6, local fuses for these relays.

Marginal relay JC is intended to be current operated by the loop current, and since *co4* is not yet closed, it is not energised. In its rest position, therefore, its left-hand (low current) contacts LC and VLC are closed, and the application of a ground via *ctr3* energises LO. Relay VLO is not energised in these circumstances owing to the non-operated contact *x2*.

Operation of LO energises at *lo1* the motor raise relay MR and clutch (the latter via SR6), and at *lo2* causes relay Y to fall back (irrespective of the state of *lls3*), to prepare the FF operating circuit.

Reverting now to the SF—FFR combination, SF when operated locks mechanically, to be released only by operation of FFR; this is illustrated pictorially in Fig. 3. Both relays are equipped with springsets, and FFR may operate independently of any operation or non-operation of SF. Rectifier SR3 rectifies the A. C. for SF, and rectifier bridge SR4 performs a similar function for FFR.

Now SF is made slow-to-operate by virtue of the closure normally of a second winding over *sf2* while FFR is made slow-to-release by virtue of the closure when operated of a second winding over *ffr1* (up). Hence, when CTR operates, FFR follows very quickly afterwards, disabling SF at *ffr2* and applying ground over *ffr3* to the FF operating chain, and to the CO operating circuit.

Hence, as soon as Y falls back (VLO, HLO and HLS being normal), FF operates and closes the operate path for CO at *ff1*. Contact *ff2* provides a holding path via *sf1* (still normal) for CTR, to prepare for the return to normal now taking place of *lls1* and 2, under the control of MR. The operation of MR and CLU has caused the motor to reverse its direction to increase the mains unit output, and the LLS set returns to normal; subsequent release of *lls3* is now without effect since Y has already released. Contacts *ff3* and 4 remove the "rectifier failure" alarm conditions.

The operation of CO at *co1* and 2 removes the "unit disconnected" alarm conditions and at *co3* prepares an operate circuit for relay X to await release of LO. At *co4*, the D. C. output of the unit is extended to the coaxial cables, and at *co5*, the delay relay DR is de-energised; release of *dr1* is ineffective now.

The current now flowing from the mains unit energises JC, and as the output current builds up, JC breaks first its VLC contact; this is of no significance since X is not yet operated; then finally its LC contact as the desired value of current is attained. This causes LO to fall back, thus stopping the motor and drive (at *lo1*), and applying ground at *lo2* to relay X via *co3*. Relay X operates, and provides a holding circuit for itself at *x1*, and prepares an operate circuit at *x2* for VLO, when required (emergency operation).

Relay JC will now regulate the output current between prescribed limits, as determined by the setting of its contacts LC and HC, say, for −1% and +1%, respectively. Closure of HC will cause the energisation of HO and the operation of ML and CLU (via *lls2* and *ho1* up, and via SR6 for CLU), whereby the motor will be driven in a direction to lower the output. Closure of LC will operate LO, to operate MR and CLU via *co1* up and *hls1*, and via SR6 for CLU, whereby the output will be raised.

Capacitors C8—C11, and resistors R5 and R6 provide spark-quench means for the contacts of JC.

The remainder of the description has to do with emergency conditions.

(*a*) *Fuse failures*

Failure of fuses F1, F5 or F6 will cause relay FFR to fall off. Relay SF will then operate over contact *ffr2* (released) and contact *sf1* will open the circuit of the contactor CTR, releasing it, and the unit will be disconnected from the mains and the load. The brushgear will then be run down to its minimum output position by the operation of ML and CLU consequent on the re-make of *ctr4*, and the low limit switch LLS operated. JC contacts will be disabled at *ctr3*. After about one minute's interval, the time delay relay DR will re-operate over *co5* (now released) from the distant unregulated mains unit. Contactor CTR will not re-operate, however, to enable the unit to build up, until the fuse has been attended to and the non-lock "Restore Key" has been manually depressed, since SF is operated and locked mechanically. Operation of CTR restores A. C. to FFR which operates, releasing SF, and the unit is eventually restored to service.

(*b*) *Line faults* (*open-circuits*)

If the line becomes an open circuit (as defined below), the armature of the current control relay JC will fall to its low side, thus closing contacts LC and VLC. Relay VLO will then operate over contacts *x2*, VLC and *ctr3*. Contact *vlo1* opens the circuit of relay FF and contact *ff1* opens the circuit of the contactor CTR, and the unit will be disconnected from the mains and the load. The brushgear will then be run down to its minimum output position and the low limit switch LLS operated (as in (*a*) above). When the open circuit fault has been rectified, the time delay relay DR will operate on current from station E and the unit will automatically switch itself on.

The line becoming open circuit includes the following fault conditions:

(I) Complete or partial open circuit of the line resulting in an output current of less than about 6% below normal (depending on setting of VLC);

(II) A short circuit at or close to station W causing fuse F7 to fail;

(III) A short circuit at or close to station E causing a fuse failure of the distant unregulated mains unit;

(IV) A power failure at station E.

If the current surge due to the short circuit is not sufficient to blow fuse F7, but is greater than +6% or 7% of normal, then contacts HC and VHC of the current control relay JC will close. Relay VHO will then operate over contacts VHC and *ctr3* and will shut the unit down in a similar manner to that described for VLO.

If either the open circuit or short circuit faults occur gradually thus enabling the control gear to correct continually the change in line current, then, in time, either the low limit switch or the high limit switch will be operated.

If the high limit switch, then contact *hls2* operating first will open the circuit of relay FF and shut the unit down as before, contact *hls1* opening the circuit of the motor raise relay MR and the clutch.

If the low limit switch, then contact *lls3* operating first will complete the circuit for the operation of relay Y over contacts *lls3* and *x1*. Contact *y1* opens the circuit of the relay FF and shuts the unit down as before.

(c) *Control failures*

If, owing to a fault, relay MR is held operated independently of the current control relay JC, then the motor will operate over contacts *mr1* and *ml1* and the output voltage and current of the unit will increase, until the contact HC of the marginal relay is closed. Relay HO will then operate and contact *ho1* close the circuit for the operation of the motor lower relay ML. Contact *ml1* will then disconnect the motor raise winding of the motor and contact *ml2* will close the motor lower circuit and the output voltage and current of the unit will decrease until relay HO falls off. Thus the output current of the unit will be held between the limits of its nominal value and +1% of its nominal value.

If, owing to a fault, both the motor raise relay MR and the motor lower relay ML operate together, only ML will be effective to operate the motor, the brushgear will run down to the low limit stop and the unit will shut down. This is due to the isolating contact *ml1* in the motor control circuit.

(d) *Fuse alarms*

A short circuit of any one of the main smoothing condensers C1–C4 (see Fig. 5A) results in the failure of the corresponding fuse and operation of the condenser failure relay CF from line voltage via the upper binding posts of the fuse alarm type fuses employed for F8—F11, fuse F12 or F13, resistor R3(*a*) or (*b*) resistor R4, and ground, giving both visible and audible alarms (see Figs. 5B and 5C).

Failure of fuse F3 causes failure of control voltage from SR2, and release of FF, CO and CTR. The latter two relays isolate the unit from the line, CO gives "Unit Disconnected" alarm, and FF falling back gives "Rectifier Failure" alarm, via *ff3* and *mf2*, and *ff4* and *mf4* (Figs. 5B and C).

On the other hand, failure of fuse F4 will cause MF to release, thereby giving a spurious "mains failure" alarm in Figs. 5B and 5C, unaccompanied, however, by "Unit Disconnected" alarm. True "mains failure" will give both alarms, by release of CO as well as MF.

The load is reasonably constant under normal conditions so that the controlled unit at station W has to cater principally for mains variations (if the mains are not controlled) and the small changes in load due to temperature changes, component changes and rectifier ageing at both ends of the loop.

The type of current controlling marginal relay envisaged for use at station W is provided with two pairs of contacts on each side of its normal floating position, adapted to be operated sequentially by continued operation of the moving system of the relay, but this type of relay may be replaced by two marginal current relays (one operating at approximately ±1% and the other at say ±6%) or by any other type of marginal relay such as a multi-contact mercury relay, or any type of relay circuit where the relays act as marginal relays.

The scheme may also be employed when there are more than two repeaters between the two supply stations.

In such a case, the initial warming-up current from station E, if based on the criterion set up above, would be very much less in the whole system than the normally flowing current, but still would be sufficient to raise the "cold" resistance of the repeaters quite materially; moreover, it would only then be necessary to provide a lower minimum starting voltage from the controlled unit so as to moderate somewhat the jump between the first and second stage currents.

Although theoretically the system described is as applicable to A. C. supply systems as to D. C. supply systems, for which it has been described, in practice considerable difficulty would be encountered in maintaining correct phase relationships around the loop, and it would be preferable to employ a single supply unit for each tube, adjustable from zero, or a very low, output current up to normal value.

While the principles of the invention have been described above in connection with specific embodiments, and particular modifications thereof, it is to be clearly understood that this description is made only by way of example and not as a limitation on the scope of the invention.

What is claimed is:

1. A telecommunication system comprising a transmission line, a plurality of repeater stations, regulated and unregulated power supply stations at each end of said line respectively for supplying said repeater stations with energising power, said unregulated station including means for applying test current to said line and stations, means preparing said repeater stations for receiving normal power in the absence of defects therein, means for connecting said regulated station to the line after said test has been successfully completed, said regulated station comprising means for supplying current to said line in gradually increasing quantity until a controlled current flow for the system as a whole is attained.

2. The system according to claim 1, wherein said transmission line comprises separate coaxial tubes for the "go" and "return" directions of transmission, separate pairs of regulated and unregulated supply units for the two directions of transmission, one of said pairs being connected in series-aiding around the loop formed by the core and sheath of its cable.

3. A telecommunication system comprising a transmission line, a plurality of repeater stations, regulated and unregulated power supply stations at each end of said line respectively for supplying said repeater stations with energizing power, said unregulated station including means for applying test current to said line and stations, means preparing said repeater stations for receiving normal power in the absence of defects therein, means for connecting said regulated station to said line after said test has been successfully completed, a main source of supply, timing means connected to the regulated supply station and responsive to the flow of test current to cause said regulated supply station to be energized from said main source of supply after a predetermined interval of time; means in said regulated supply station responsive to the application of said main source of supply for supplying power to said line;

and further means in said regulated supply station for controlling the output of power therefrom, whereby the combined line current gradually increases from an initially subnormal value to a final controlled value for the system as a whole.

4. The system according to claim 3, further comprising a contactor controlling the flow of the main source of supply to said regulated supply station, said timing means comprising a delay relay having an operating winding and a contact, said operating winding arranged to be energized by the flow of said test current, and said contact arranged to operate said contactor.

5. The system according to claim 3, wherein said regulated station comprises protection means for limiting the flow of current arising from open-circuits or short-circuits within the system.

6. The system according to claim 3, further comprising a marginal relay having an armature and at least two pairs of contact-making members on each side of its normally set position, said relay being responsive to current flow from said regulated supply station, the pairs of contacts on each side being arranged for sequential operation by the armature of the relay when there are continued deviations from a predetermined value of current flow.

7. The system according to claim 6, further comprising relay means for controlling the supply of power from said regulated supply station to said line system, said relay means being controlled by one of said contact making members.

RICHARD KELLY.

References Cited in the file of this patent

UNITED STATES PATENTS

| Number | Name | Date |
|---|---|---|
| 2,018,850 | Green et al. | Oct. 29, 1935 |
| 2,260,160 | Benning et al. | Oct. 21, 1941 |
| 2,321,723 | Zinn | June 15, 1943 |